US012492070B2

(12) United States Patent
Yang

(10) Patent No.: US 12,492,070 B2
(45) Date of Patent: Dec. 9, 2025

(54) APPARATUS FOR COLLECTING CONTAINER

(71) Applicant: THE GREET INC, Seoul (KR)

(72) Inventor: Woo Jeong Yang, Seoul (KR)

(73) Assignee: THE GREET INC, Seoul (KR)

( * ) Notice: Subject to any disclaimer, the term of this patent is extended or adjusted under 35 U.S.C. 154(b) by 449 days.

(21) Appl. No.: 18/011,627

(22) PCT Filed: Aug. 29, 2022

(86) PCT No.: PCT/KR2022/012860
§ 371 (c)(1),
(2) Date: Dec. 20, 2022

(87) PCT Pub. No.: WO2023/200050
PCT Pub. Date: Oct. 19, 2023

(65) Prior Publication Data

US 2023/0331471 A1 Oct. 19, 2023

(30) Foreign Application Priority Data

Apr. 13, 2022 (KR) ........................ 10-2022-0045916

(51) Int. Cl.
*B65F 1/00* (2006.01)
*B08B 1/16* (2024.01)
(Continued)

(52) U.S. Cl.
CPC ............ *B65F 1/0033* (2013.01); *B08B 1/165* (2024.01); *B08B 3/02* (2013.01); *B08B 9/093* (2013.01);
(Continued)

(58) Field of Classification Search
CPC ...... B65F 1/08; B65F 1/14; B65F 7/00; B65F 1/0033; B65F 1/1426; B65F 1/1607; B08B 1/165; B08B 3/02; B08B 9/093
See application file for complete search history.

(56) References Cited

U.S. PATENT DOCUMENTS 6,698,226 B1 * 3/2004 Mahloch ............... B08B 9/0936 62/272
7,926,749 B2 * 4/2011 Santandrea ......... B02C 18/0084 241/285.2
(Continued)

FOREIGN PATENT DOCUMENTS

CN 212150260 U * 12/2020
CN 113525958 A * 12/2021
(Continued)

*Primary Examiner* — Saul Rodriguez
(74) *Attorney, Agent, or Firm* — NKL Law; Jae Youn Kim

(57) ABSTRACT

According to an embodiment of the present invention, a container collecting apparatus is provided. The container collecting apparatus includes: a container input unit for at least temporarily accommodating a container inserted; and a collection unit provided below the container input unit to collect the container transferred from the container input unit, wherein the container input unit includes: a holding unit on which the container is seated; an opening penetratively formed at one side of the holding unit to transfer the container to the collection unit; and a transfer unit provided with a transfer plate for transferring the container put on the holding unit to the opening by moving from the opposite side of the holding unit toward the opening.

14 Claims, 8 Drawing Sheets

(51) Int. Cl.

| | |
|---|---|
| ***B08B 3/02*** | (2006.01) |
| ***B08B 9/093*** | (2006.01) |
| ***B08B 13/00*** | (2006.01) |
| ***B65F 1/14*** | (2006.01) |
| ***B65F 1/16*** | (2006.01) |
| ***B65F 7/00*** | (2006.01) |

(52) U.S. Cl.
CPC ............ *B08B 13/00* (2013.01); *B65F 1/1426* (2013.01); *B65F 1/1607* (2013.01); *B65F 7/00* (2013.01); *B08B 2209/08* (2013.01); *B65F 2210/128* (2013.01); *B65F 2210/138* (2013.01); *B65F 2210/152* (2013.01); *B65F 2210/168* (2013.01); *B65F 2210/184* (2013.01)

(56) References Cited

U.S. PATENT DOCUMENTS

| | | | | |
|---|---|---|---|---|
| 2011/0253817 A1* | 10/2011 | Jeon | B30B 9/321 | 241/81 |
| 2013/0112791 A1* | 5/2013 | Jeon | B07C 5/00 | 241/34 |
| 2014/0305851 A1* | 10/2014 | Hubbell | B65F 1/1473 | 209/552 |

FOREIGN PATENT DOCUMENTS

| | | | | |
|---|---|---|---|---|
| JP | 10218301 | A | * | 8/1998 |
| KR | 101926392 | B1 | * | 12/2018 |
| KR | 20190091811 | A | * | 8/2019 |
| KR | 102344688 | B1 | * | 12/2021 |

* cited by examiner

APPARATUS FOR COLLECTING CONTAINER

TECHNICAL FIELD

The present invention relates to a container collecting apparatus.

BACKGROUND ART

The plastic production all over the world has been explosively raised from 1,500,000 ton in 1950 to 397,000,000 ton in 2020. Moreover, recently, plastic usage is more explosively increasing due to the prolonged COVID-19. However, unlike the recognition that plastic is recyclable, the average OECD recycling rate is very low to about 34%. Because of the plastic recycling problem, policies are gradually changed to induce a decrease in plastic consumption even in Korea.

For example, in Korea, the use of plastic cups, plastic straws or the likes in stores is prohibited. Accordingly, in a case in which a customer pays a deposit, a worker in a store provides a reusable container. When the customer returns the reusable container, the worker refunds the deposit. When a customer uses a reusable container, the quantity of stores providing discount benefit is gradually increasing. However, such a reusable container has several disadvantages in that it requires lots of manpower or time to collect reusable containers and in that a collection rate is low.

DISCLOSURE

Technical Problem

Accordingly, the present invention has been made in view of the above-mentioned problems occurring in the related art, and it is an object of the present invention to provide a container collecting apparatus capable of allowing a user to directly return a container to minimize manpower and time required for collecting containers, and performing deposit refund based on the kind, quantity and the like of the collected containers, thereby increasing a collection rate of containers.

Technical objects to be achieved by the present invention are not limited to the above-described objects and other technical objects that have not been described will be evidently understood by those skilled in the art from the following description.

Technical Solution

To accomplish the above-mentioned objects, according to the present invention, there is provided a container collecting apparatus including: a container input unit for at least temporarily accommodating a container inserted; and a collection unit provided below the container input unit to collect the container transferred from the container input unit, wherein the container input unit includes: a holding unit on which the container is seated; an opening penetratively formed at one side of the holding unit to transfer the container to the collection unit; and a transfer unit provided with a transfer plate for transferring the container put on the holding unit to the opening by moving from the opposite side of the holding unit toward the opening.

Moreover, the container input unit further includes: a cover unit disposed at one side of the holding unit to move between a first position in which at least a portion of the cover unit closes the opening and a second position in which at least a portion of the cover unit opens the opening.

Furthermore, the cover unit includes: a coupling part coupled to an inner surface of the container input portion; and a cover plate configured to rotate between the first position and the second position around the coupling part to close the opening.

Additionally, the cover unit further includes a lower plate extending downward from an end of the cover plate to form a predetermined angle to the cover plate and disposed adjacent to a side surface of the holding unit at the first position.

In addition, the transfer unit includes: the transfer plate; a transfer body of which one end is coupled to the transfer plate; transfer rails for guiding movement of the transfer body; and a transfer driving part for transferring the transfer body and the transfer plate along the transfer rails.

Moreover, the transfer unit further includes: an extension part extending from the other end of the transfer body toward the opening. In a case in which the extension part comes into close with one side of the cover unit and applies an external force as the transfer body moves toward the opening, the cover unit opens the opening by rotating from the first position to the second position.

Furthermore, the cover unit includes an elastic part applying an elastic force to the cover plate from the second position to the first position.

Additionally, a wiper is provided at a lower end of the transfer plate to clean the holding unit while moving in close contact with the upper surface of the holding unit when the transfer plate moves.

In addition, at least one discharge hole for spraying cleaning liquid to the holding unit is formed at the lower end of the transfer plate.

Moreover, the container collecting apparatus further includes at least one container detection unit for detecting at least one among the state and the kind of the container.

Furthermore, the container detection unit comprises at least one among a camera for capturing an image of the inserted container, a weight detection unit for measuring the weight of the container, and a code recognition unit for recognizing an identification code of the container.

Additionally, the container collecting apparatus further includes a communication unit configured to transmit at least one among the image of the container obtained from the camera, the weight of the container obtained from the weight detection unit, and the identification code acquired from the code recognition unit to a server of a container collection system.

In addition, the container collecting apparatus further includes a door unit configured to open and close an inlet of the container input unit, and allow or block that a container is inserted into the container input unit.

Moreover, the camera is disposed on at least one among the inner surface of the door unit and the upper side of the inner surface of the container input unit.

Furthermore, the container collecting apparatus further includes at least one cleaning liquid spray unit provided below the container input unit to spray a cleaning liquid to the inside of the collection unit, wherein the cleaning liquid spray unit sprays the cleaning liquid to different regions of the collection unit while moving by the transfer unit.

Additionally, the collection unit comprises a height detection unit for detecting a collection amount of the containers collected in the collection unit.

In addition, the container collecting apparatus further includes a vibration generating unit provided at one side of the collection unit to apply vibration to the collection unit.

Advantageous Effects

According to the present invention, when a user puts the container into the container input unit, the container collecting process may be simply performed through the transfer unit, the cover unit, and the like. Accordingly, the container collecting apparatus according to the present invention allows the user to easily perform collection of a container, thereby minimizing required manpower or time in collecting containers and maximizing efficiency in collection of containers.

In addition, the container collecting apparatus according to the present invention can detect the kind and quantity of containers, whether the container is damaged or not, and whether foreign matters are contained or not, through container detection units of various kinds, and pay the deposit determined on the basis of the kind and quantity of the container, whether the container is damaged or not, and whether foreign matters are contained or not.

Moreover, the container collecting apparatus according to the present invention can sanitarily manage the inside of the container input unit through the wiper and sanitarily manage the collected container through the cleaning liquid spray unit, thereby preventing the propagation of germs or generation of bad smells.

In addition, the container collecting apparatus according to the present invention can prevent the user's hand from being caught in the door unit by mounting the motion sensor in the region in which the door unit is disposed, and prevent negative actions, for instance, that a user takes the container back after the recognition of the container or payment of the deposit.

The effects obtainable by the container collecting apparatus according to the present invention are not limited to the above-mentioned effects and further effects not described above will be clearly understood by those skilled in the art.

DESCRIPTION OF DRAWINGS

Brief description of drawings will be provided in order to sufficiently understand the drawings cited in the detailed description of the present invention.

MODE FOR INVENTION

Figure 1:
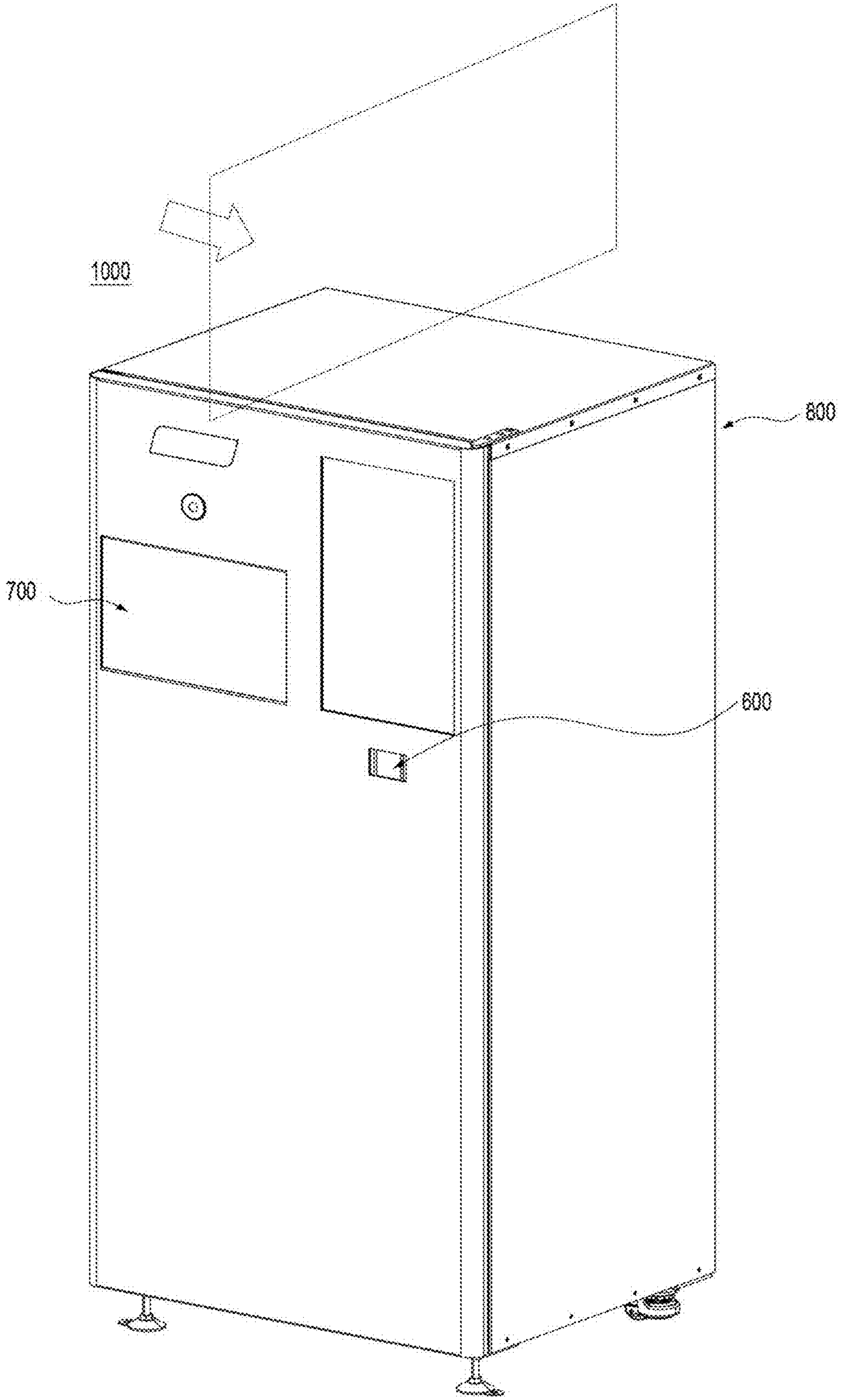
FIG. 1 is a perspective view of a container collecting apparatus according to an embodiment of the present invention.

Hereinafter, exemplary embodiments according to the present invention will be described in detail with reference to the contents disclosed in the accompanying drawings. In addition, a method of configuring and using an apparatus according to an embodiment of the present invention will be described in detail with reference to the accompanying drawings. Like reference numerals or symbols presented in the drawings denote parts or components that perform substantially the same functions. For convenience of description, the upward, downward, leftward, and rightward directions are written based on the drawings, and the scope of the present invention is not limited by the corresponding directions.

It will be understood that, although the terms first, second, etc. may be used herein to describe various elements, these elements should not be limited by these terms. These terms are only used to as labels distinguish one element from another. For example, a first signal could be termed a second signal, and, similarly, a second signal could be termed a first signal without departing from the teachings of the disclosure. The term "and/or" includes a combination of a plurality of related items or any one item among a plurality of related items.

The terms used herein are used to describe embodiments, and are not intended to limit and/or restrict the present invention. The singular forms are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the description of the present invention, to connect some part with another part means that some part is directly connected with another part and that some part is indirectly connected with another part through an element. Furthermore, unless otherwise defined herein, to include a component does not mean that the mortise lock excludes other component but means that the mortise lock can include other components more.

Figure 2:
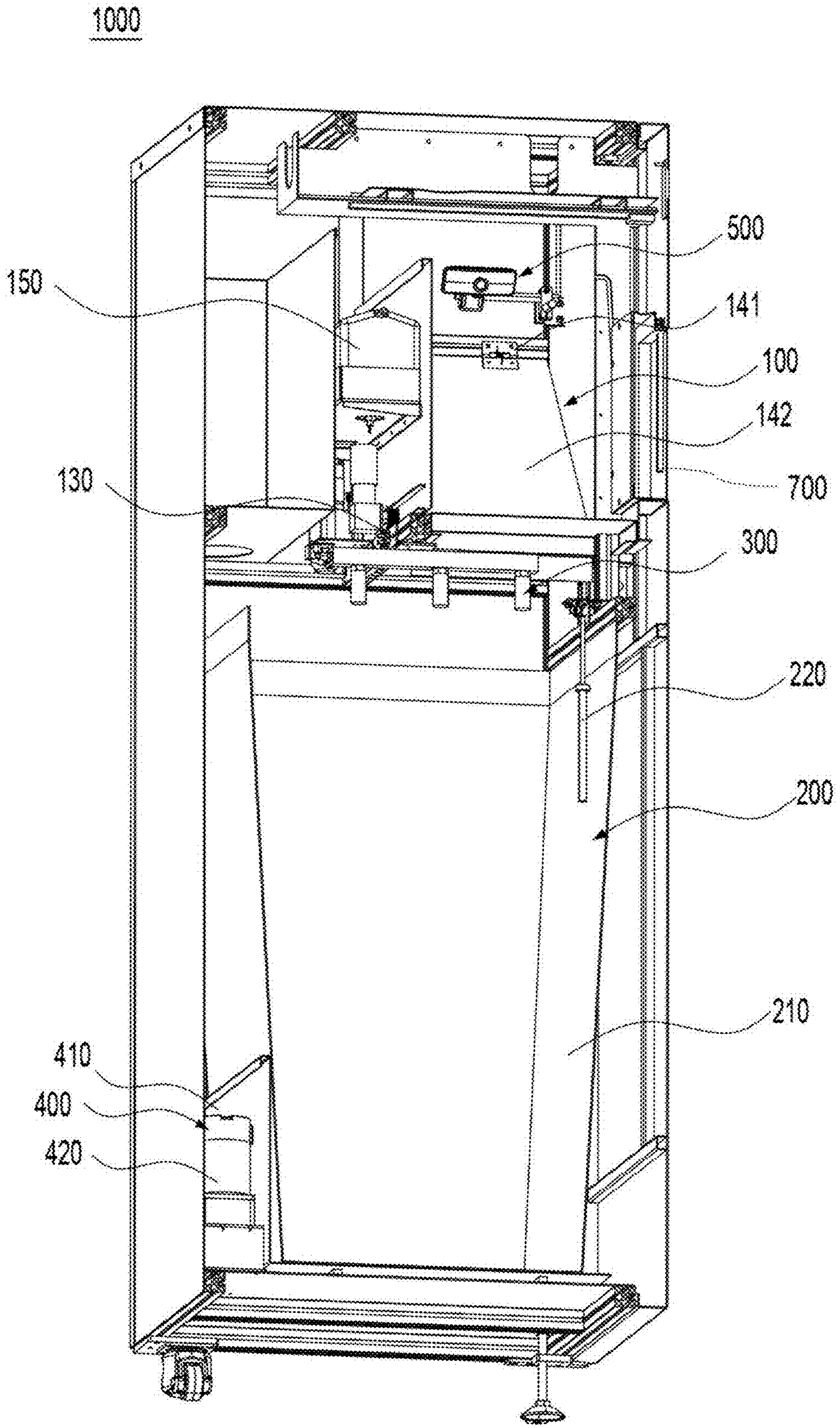
FIG. 2 is a perspective sectional view of the container collecting apparatus according to the embodiment of the present invention.
Figure 3:
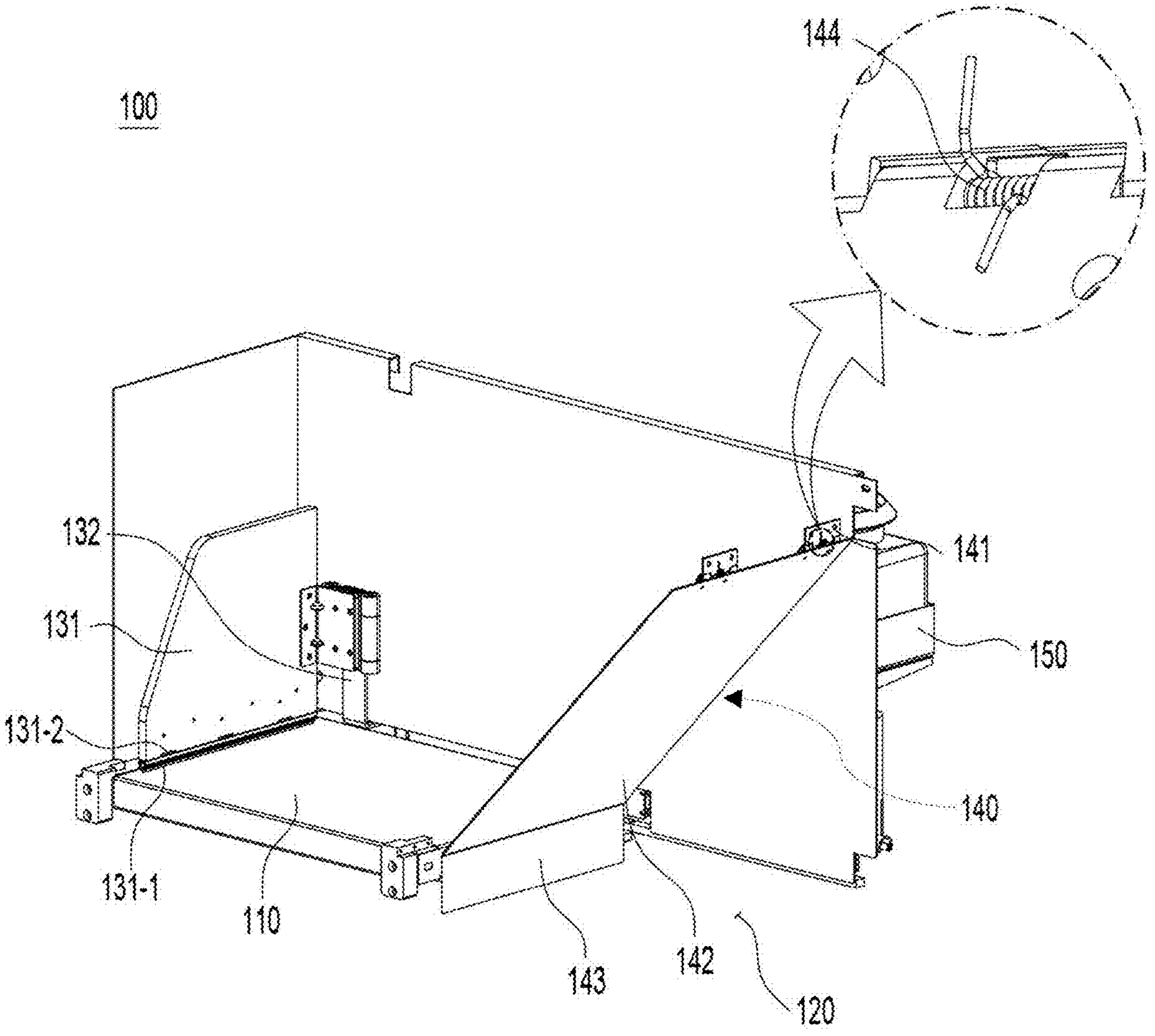
FIGS. 3 and 4 are perspective views of at least a portion of a container input unit according to the embodiment of the present invention.
Figure 4:
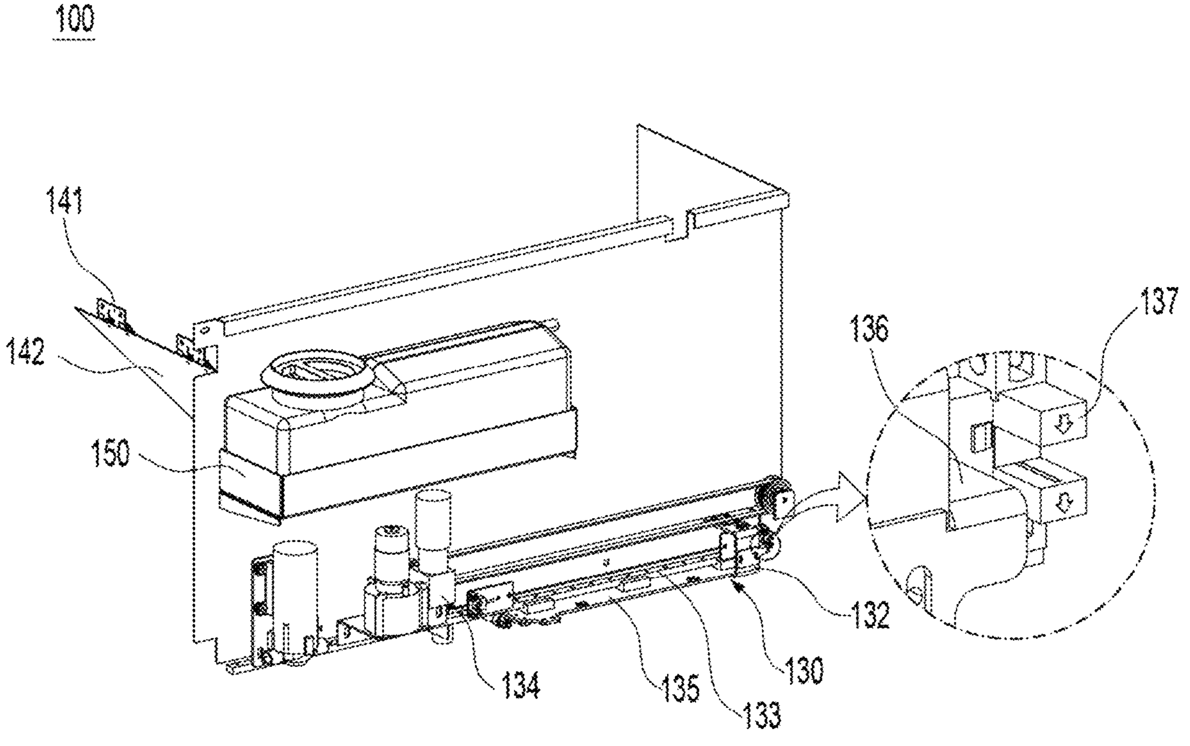
Figure 5:
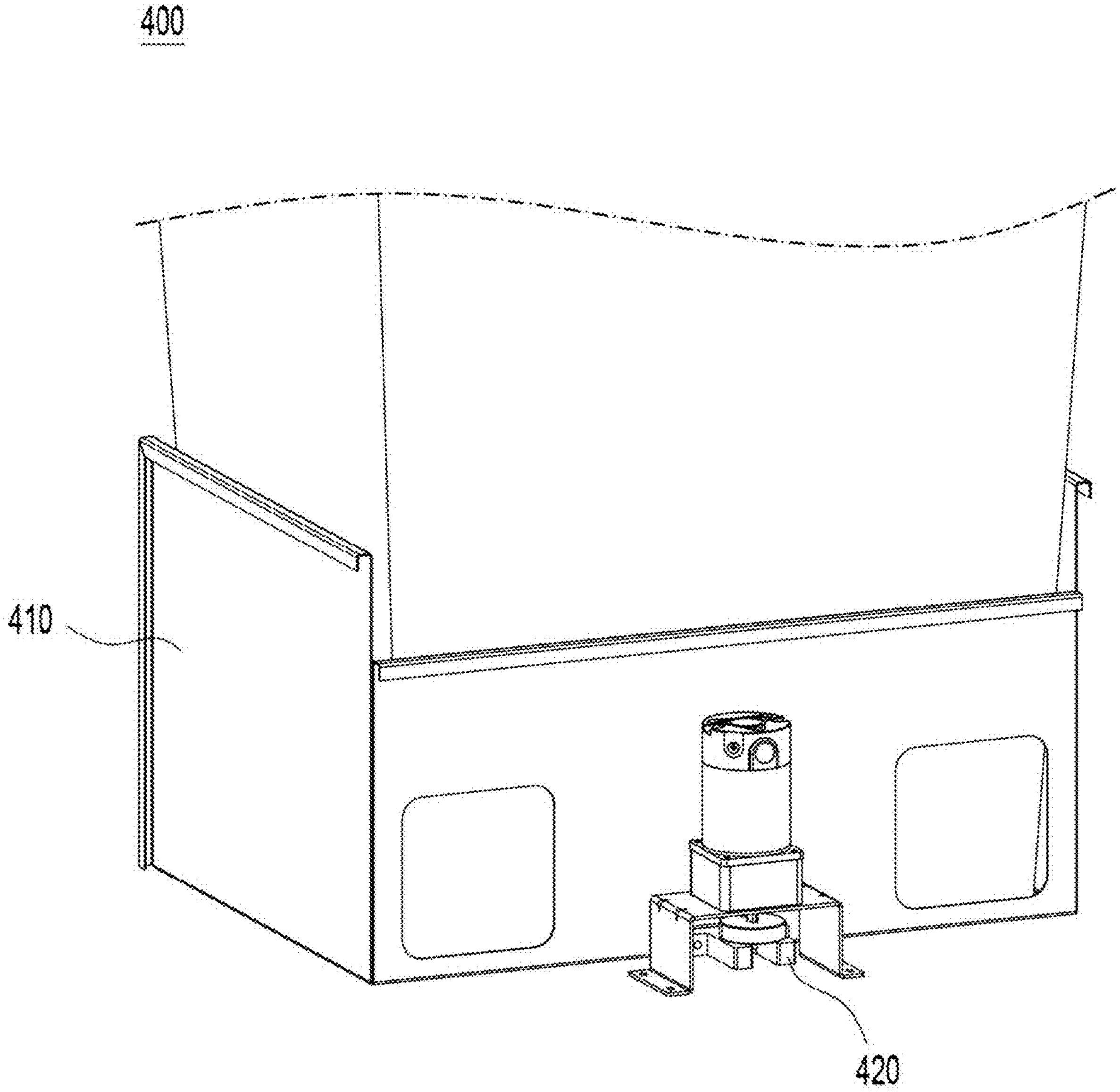
FIG. 5 is a perspective view of a vibration generating unit according to the embodiment of the present invention.

FIG. 1 is a perspective view of a container collecting apparatus according to an embodiment of the present invention, FIG. 2 is a perspective sectional view of the container collecting apparatus according to the embodiment of the present invention, FIGS. 3 and 4 are perspective views of at least a portion of a container input unit according to the embodiment of the present invention, and FIG. 5 is a perspective view of a vibration generating unit according to the embodiment of the present invention.

Referring to FIGS. 1 to 5, the container collecting apparatus 1000 may include a container input unit 100, a collection unit 200, a cleaning liquid spray unit 300, a vibration generating unit 400, a container detection unit 500 or 600, a door unit 700, and/or a housing 800.

The container input unit 100 is an area in which a user inserts a container thereinto, and at least temporarily accommodates the inserted container. For example, the container capable of being inserted into the container input unit 100 may be a container made of various materials, such as a synthetic resin material such as PET (PETE), HDPE, PVC, PP, or the like, or a metal material such as aluminum, stainless steel, or the like, and may be a container used for various purposes such as multi-use, disposable use, cooking, and the like. In addition, as another example, the container may have various shapes or sizes such as a cylindrical shape, a cone shape, a hemispherical shape, a polygonal column, a polygonal cone, a tubular shape, a pump type, a spray type, or the like. However, the present invention is not limited thereto.

In an embodiment, the container input part 100 may include a holding unit 110, an opening 120, a transfer unit 130, and/or a cover unit 140.

The container inserted into the container input unit 100 through an inlet may be put on the holding unit 110 holding unit 110. In detail, the container is put on the upper surface of the holding unit 110, moves along the upper surface of the holding unit 110 by the operation of the transfer unit 130, and then, is transferred to the collection unit 200.

The opening 120 may allow the container put on the holding unit 110 to be transferred to the collection unit 200. The opening 120 may be formed through one side of the holding unit 110 to form a space in which the container input unit 100 and the collection unit 200 communicate with each other.

The transfer unit 130 may transfer various components of the container collecting apparatus 1000. For example, the transfer unit 130 may transfer the container put on the holding unit 110 to the opening 120, or transfer the cleaning liquid spray unit 300 in a lateral direction (for instance, in a reciprocating direction from the holding unit 110 to the opening 120). Accordingly, the transfer unit 130 may include a transfer plate 131, a transfer body 132, transfer rails 133, a transfer driving part 134, and/or an extension part 135.

The transfer plate 131 may be disposed at one side of the holding unit 110 to vertically extend from the upper surface of the holding unit 110 to a predetermined height, and move from the opposite side of the holding unit 110 toward the opening 120 to move the container. For example, in a case in which the transfer plate 131 moves toward the opening 120 and comes into contact with one side of the container put on the holding unit 110, the container may move toward the opening 120 by an external force applied from the transfer plate 131. The transfer plate 131 may be so wide that at least a portion of the container may get in contact with the transfer plate 131.

In an embodiment, the transfer plate 131 may include a wiper 131-1 disposed at a lower end thereof to clean the upper surface of the holding unit 110. For instance, when the transfer plate 131 moves, the wiper 131-1 moves in close contact with the upper surface of the holding unit 110 to wipe contaminants, such as dust or moisture attached to the holding unit 110, or foreign matters from the container. To that end, the transfer plate 131 and the wiper 131-1 may be formed to have a length corresponding to the front and rear widths of the upper surface of the holding unit 110.

In an embodiment, the transfer plate 131 may have at least one discharge hole 131-2 for spraying cleaning liquid. For example, the wiper 131-1 may be connected to a detergent containing unit 150 through a nozzle, a hose, or the like to spray the cleaning liquid transferred from the detergent containing unit 150 onto the upper surface of the holding unit 110 through the discharge hole 131-2. The wiper 131-1 may effectively remove contaminants from the holding unit 110 while moving on the upper surface of the holding unit 110 onto which the cleaning liquid is sprayed.

The transfer body 132 may move the transfer plate 131 in a state in which one end of the transfer body 132 is coupled to the transfer plate 131. In this instance, the transfer body 132 may move along the transfer rails 133, and the moving direction may be the reciprocating direction from the holding unit 110 to the opening 120.

The transfer rails 133 may guide movement of the transfer body 132. For example, the transfer rails 133 may extend from a point of the holding unit 110 toward the opening 120 to provide a moving path of the transfer body 132.

The transfer driving part 134 may transfer the transfer body 132 along the transfer rails 133. For example, the transfer driving part 134 may be a rotary motor, and may be connected to the transfer body 132 via at least one belt pulley structure. However, the structure of the transfer driving unit 134 according to the present invention is not limited thereto, and any known structure capable of moving the transfer body 132 on the transfer rails 133 may be applied.

In an embodiment, the extension part 135 may get in contact with one side of the cover part 141 and apply an external force to the cover part 141 to rotate the cover part 141 (particularly, the cover plate 142). For instance, the extension part 135 may move in the direction of the opening 120 together with the transfer body 132 and start to rotate the cover unit 140 while getting in contact with one side of the cover plate 142, especially, the lower plate 143. To that end, the extension part 135 may extend to the opening 120 from an end opposed to the end to which the transfer plate 131 of the transfer body 132 is coupled by a predetermined length.

In an embodiment, the transfer unit 130 may further include a transfer marker 136 and a transfer detection unit 137 for detecting the position of the transfer body 132. Specifically, the transfer marker 136 may extend from one side of the transfer body 132 in an opposite direction to the opening 120, and the transfer detection unit 137 may be provided on at least one of the transfer rails 133. As the transfer body 132 moves along the transfer rails 133, the transfer marker 136 is aligned with the transfer detection unit 137, thereby controlling initiation of movement, direction change of movement, and/or termination of movement (that is, operations of the transfer driving unit 134) in one direction with respect to the transfer body 132. To that end, the transfer detection unit 137 may include a distance measuring sensor or an object detecting sensor. However, the present invention is not limited thereto, and various sensing technologies may be applied to the transfer detection unit 137 according to an embodiment to which the present invention is applied.

In an embodiment, the transfer detection unit 137 may include a first transfer detection unit and a second transfer detection unit. For example, the first transfer detection unit and the second transfer detection unit may be provided at both ends of the transfer rails 133.

In this case, when suitability for input and collection of a container is detected in a state in which the transfer marker 136 and the first transfer detection unit are aligned, the transfer driving part 134 rotates in one direction to move the transfer body 132 in the direction of the opening 120. Continuously, when the transfer marker 136 and the second transfer detection unit are aligned, the transfer driving part 134 rotates in the opposite direction to move the transfer body 132 to the original location. Next, the transfer marker 136 and the first transfer detection unit are aligned again to terminate the transfer. That is, as the transfer body 132 moves, when the second transfer detection unit detects the transfer marker 136, the transfer driving part 134 converts the moving direction of the transfer body 132 into the reverse direction. When the first transfer detection unit detects the transfer marker 136 again, the movement of the transfer body 132 may be terminated.

The cover 140 may be disposed at one side of the holding unit 110 to close or open the opening 120. To that end, the cover unit 140 may include a coupling part 141, a cover plate 142, a lower plate 143, and/or an elastic part 144.

The coupling part 141 may allow the cover plate 142 to be rotatably coupled to the inner surface of the container input unit 100. To that end, the coupling part 141 may include at least one hinge, but is not limited thereto.

The cover plate 142 may move between the first position and the second position while rotating around the coupling part 141, thereby closing the opening 120. In a case in which the cover plate 142 is disposed at the first position, the opening 120 may be closed by the cover plate 142, thereby preventing the container from being transferred to the collection unit 200. In addition, in a case in which the cover plate 142 is disposed at the second position, the cover plate 142 may open the opening 120 to transfer the container moved by the transfer unit 130 to the collection unit 200.

In an embodiment, the cover plate 142 may extend to be inclined upward from the first position toward the coupling part 141 with respect to the upper surface of the holding unit 110 so as to rotate easily.

The lower plate 143 may be disposed on the side surface of the holding unit 110 at the first position of the cover unit 140 to get in contact with an end of the extension part 135, and receives an external force from the extension part 135 according to the movement of the transfer body 132, thereby allowing the cover plate 142 to rotate between the first position and the second position. To that end, the lower plate 143 may be at a predetermined angle to the cover plate 142 and extend downward from an end of the cover plate 142.

The elastic part 144 may apply an elastic force to the cover plate 142 to restore the cover plate 142, which rotated to the second position, to the first position. For instance, the elastic part 144 is formed with a spring, and is disposed on the coupling part 141. When the transfer body 132 is returned to the original position after the container is transferred to the collection unit 200, the cover plate 142 may be returned to the first position by the elastic force of the elastic part 144. However, the configuration of the elastic part 144 is not limited thereto, and any known structure capable of returning the position of the cover plate 142 may be applied.

In an embodiment, the container input unit 100 may further include a detergent containing unit 150 which accommodates the cleaning liquid and transfers the cleaning liquid to various components of the container collecting apparatus 1000. For example, the detergent containing unit 150 may be connected to the transfer plate 131 and/or the cleaning liquid spray unit 300 through a nozzle, a hose, or the like, so that the cleaning liquid may be sprayed onto the upper surface of the holding unit 110 and/or the inside of the collection unit 200.

The collection unit 200 may be disposed at a lower side of the container input unit 100 to collect a container transferred from the container input unit 100. The opening 120 may be opened by the transfer unit 130, and the container may be transferred to the collection unit 200 through the opening 120.

The collection unit 200 may include a recovery box 210 and/or a height detection unit 220.

The recovery box 210 may accommodate the collected containers. For example, the recovery box 210 may have a space of which the upper end is opened and in which the container can be accommodated so as to collect containers transferred from the container input unit 100. In this instance, the recovery box 210 may have a size suitable for collecting a plurality of containers having various kinds, purposes, sizes, and shapes.

The height detection unit 220 may be provided at one side of the collection unit 200 to detect a collection amount of the containers collected in the recovery box 210. For example, the height detection unit 220 may measure the height of the containers collected in the recovery box 210, the height of the cleaning liquid contained in the recovery box 210, and transfer the measured height to a server of a container collection system. In this instance, the server may analyze information received from the height detection unit 220 to detect the collection amount of the containers. In a case in which it is detected that containers were collected more than a predetermined amount (for example, 80% of the recovery box 210), a signal may be transferred to a manager terminal to replace the recovery box 210 or arrange the containers collected in the recovery box 210.

The cleaning liquid spray unit 300 may be provided at a lower side of the container input unit 100 to spray the cleaning liquid into the collection unit 200 (particularly, the recovery box 210). For example, the cleaning liquid spray unit 300 may be connected to the detergent containing unit 150 through a nozzle, a hose, or the like, so that the cleaning liquid transferred from the detergent containing unit 150 may be sprayed into the recovery box 210, thereby preventing the propagation of germs or generation of bad smells in the collection box 210 and/or the containers collected in the recovery box 210.

In an embodiment, the cleaning liquid spray unit 300 may be connected to one side of the transfer body 132 (particularly, the extension part 135) to move together with the transfer body 132. Accordingly, the cleaning liquid spray unit 300 may spray the cleaning liquid to different regions of the collection unit 200 while reciprocating in the movement direction of the transfer body 132.

The vibration generating unit 400 may be provided at one side of the collection unit 200 to apply vibration to the collection unit 200, thereby aligning the containers so that the containers are not concentrated and stacked only at a specific position. To that end, the vibration generating unit 400 may include a frame 410 and a vibration driving part 420. FIG. 5 illustrates that the vibration generating unit 400 is provided below the collection unit 200, but is not limited thereto, and may be applied to various positions capable of applying vibration to the collection unit 200.

The frame 410 may surround at least a portion of the recovery box 210 and accommodate the recovery box 210 therein. The vibration driving unit 420 and/or the recovery box detection unit may be provided in the frame 410 to check whether the recovery box 210 is accommodated, and apply vibration to the recovery box 210.

The vibration driving part 420 may be provided at one side of the frame 410 to apply vibration to the recovery box 210 through the frame 410 periodically or aperiodically. For example, one side of the vibration driving part 420 may be fixed to the bottom surface of the container collecting apparatus 1000 (particularly, the housing 800), and the other side thereof may be fixed to the frame 410 to constantly apply vibration to the collecting box 210 through eccentric rotation or the like. However, the position and structure of the vibration driving unit 420 of the present invention are not limited thereto, and all positions and structures for applying vibration to the recovery box 210 may be applied.

In an embodiment, the vibration generating unit 400 may further include a recovery box detection unit for detecting whether the recovery box 210 is accommodated inside the frame 410 or not. Only when it is confirmed that the collection box 210 is accommodated inside the frame 410 by the recovery box detection unit, the transfer unit 130 may start to transfer the container, or the vibration driving unit 420 may apply vibration.

The container detection unit 500 or 600 may detect whether the container is inserted or not, a state and/or a type of the container, and the like. For example, the container detection unit 500 or 600 may include at least one among a camera, a weight detection unit, a code recognition unit, an infrared sensor, and an ultrasonic sensor. However, such a container detection unit is merely an example, and is not limited thereto.

In an embodiment, in a case in which the container detection unit 500 or 600 includes the camera 500, the camera 500 may be provided on the upper surface of the inner face of the container input unit 100 and/or the inner surface of the door unit 700 to capture images of the inside of the container input unit 100, that is, the container and/or around the container. In addition, in a case in which a weight detection unit is included, the weight detection unit may be provided below the holding unit 110 to measure the weight of the container.

In an embodiment, in a case in which the container detection unit 500 or 600 includes a code recognition unit 600, the code recognition unit 600 may recognize an identification code of the container existing in the container. In this instance, the identification code of the container may include unique identification information such as a type, a shape, a material, and a return validity period of the container. For example, the identification code of the container may include an RFID, an NFC, an NFC Tag, a QR code, a barcode, or the like. However, the present invention is not limited thereto, and various methods such as a method capable of transmitting and receiving data through a short-range wireless communication method may be applied.

In an embodiment, various kinds of information on the container obtained through the container detection unit 500 or 600 may be transmitted to a server of the container collection system. The server may analyze at least one among an image of the container obtained from the camera 500, the weight of the container obtained from the weight detection unit, and the identification code of the container obtained from the code recognition unit 600 to detect information on the container. For instance, the server may detect the kind, quantity, and the like of containers obtained from the image of the container or the identification code of the container. In addition, for example, it is possible to detect through the image of the container whether the container is damaged, whether a foreign matter is included, or whether dust, foreign matters, or the like are attached to the holding unit 110. For another example, the server may compare the weight of the container corresponding to the identification code and the weight of the container detected by the weight detection unit with each other to detect whether foreign matters are included in the container or not.

The door unit 700 may open and close the inlet of the container input unit 100 and allow or block that a container is inserted into the container input unit 100. For example, the container detection unit 500 or 600 (particularly, the camera 500) may be provided on the inner surface of the door unit 700 facing the container input unit 100 to detect the container. In this instance, in a case in which the cameras 500 are simultaneously provided on the inner surface of the door unit 700 and the upper side of the inner surface of the container input unit 100, the server may accurately detect the type, shape, etc. of the container from images acquired from different angles.

The housing 800 may accommodate components of the container collecting apparatus 1000, such as the container input unit 100, the collection unit 200, the cleaning liquid spray unit 300, and the vibration generating unit 400. The code recognition unit 600 and/or a display unit may be provided on a side surface of the housing 800, and the door unit 700 may be arranged by penetrating through a region corresponding to the inlet of the container input unit 100. According to an embodiment, the door unit 700 or the housing 800 may further include a motion sensor to detect a user's behavior, thereby preventing a user's hand from being caught, or preventing a negative action, for instance, that a user takes the container back after the recognition of the container or payment of the deposit.

In an embodiment, the container collecting apparatus 1000 may further include a communication unit for transmitting various kinds of information on the container obtained from the container detection unit 500 or 600 to the server of the container collecting system. For example, the communication unit may transmit at least one among the image of the container obtained from the camera 500, the weight of the container obtained from the weight detection unit, and the identification code of the container obtained from the code recognition unit 600 to the server. The server may identify the type, state, quantity, and the like of the container based on the received information, and calculate the deposit of the container based on the identified type, state, quantity, and the like. The deposit may be paid to a user (or a user terminal) through the server or the container collecting apparatus 1000. In addition, the communication unit may receive information on the deposit of the container determined based on the kind and quantity of the container, information relating to whether to refund the deposit determined based on the degree of a damage of the container, and the like from the server.

Furthermore, for example, the communication unit may receive information or the like relating to whether the cleaning liquid is sprayed, which is determined based on whether there is a foreign matter. That is, in a case in which the communication unit receives information about a state in which dust, foreign matters, water, etc. are attached to the holding unit 110, the transfer unit 130 may clean the holding unit 110 through the wiper 131-1 and the discharge hole 131-2.

In an embodiment, the container collecting apparatus 1000 may further include a deposit refund unit. For example, the deposit refund unit may recognize a refund means, which a user desires, through an RFID, an NFC, an NFC Tag, a QR code, a barcode, or the like, and may pay the deposit to the refund means through communication with the server. For example, the refund means may include a transportation card and/or an electronic wallet.

The container collecting apparatus 1000 according to FIGS. 1 to 5 is just exemplary, and various configurations may be applied according to embodiments to which the present invention is applied.

Figure 6A:
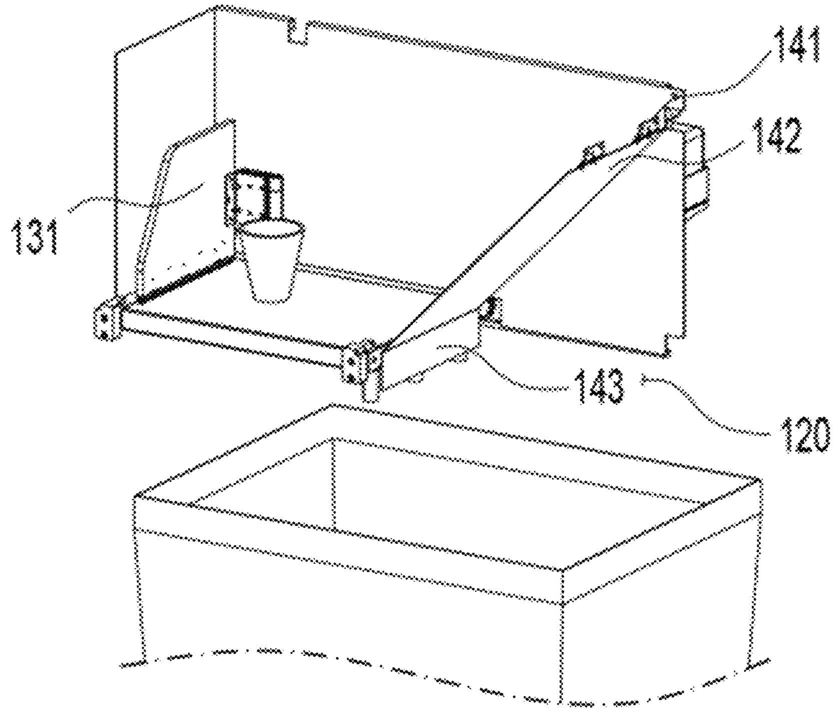
FIGS. 6A-6C are views illustrating an operating method of a container collecting apparatus according to an embodiment of the present invention.
Figure 6B:
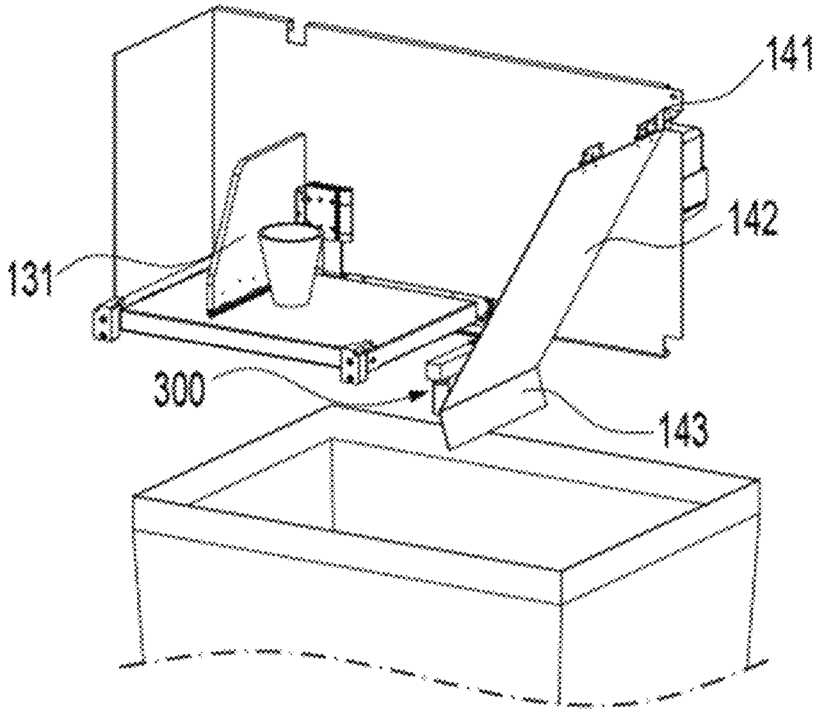
Figure 6C:
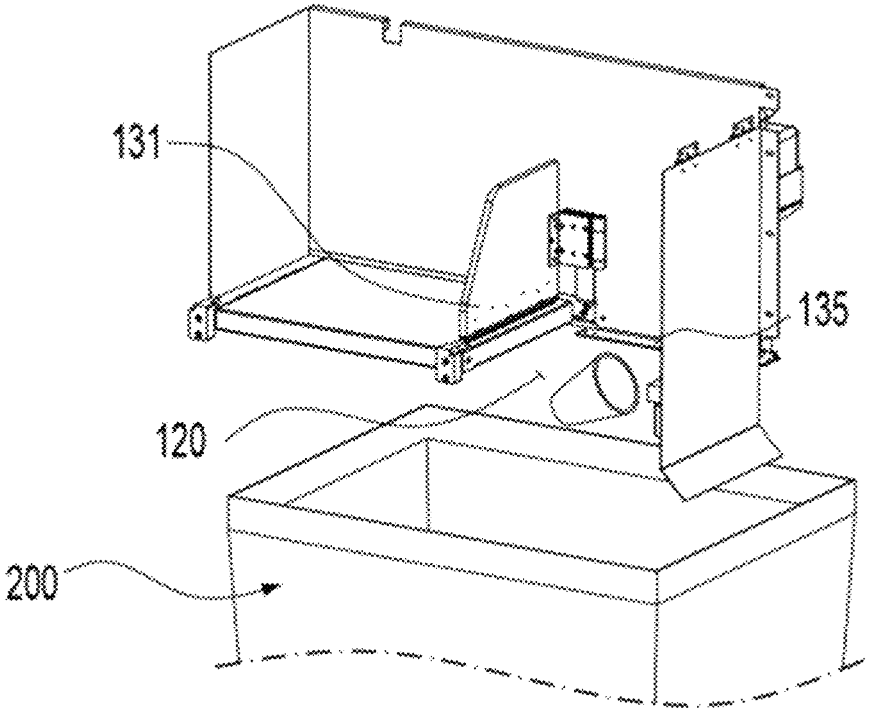

FIGS. 6A-6C are views illustrating an operating method of a container collecting apparatus according to an embodiment of the present invention.

Referring to FIGS. 6A-6C, a container may be inserted into the container input unit 100 (See FIG. 6A). In this instance, the cover plate 142 may be disposed at the first position which closes the opening 120, the lower plate 143 may come into close contact with the side surface of the mounting portion 110, and the transfer marker 136 and the first transfer detection unit may be aligned with each other.

The inserted container may be detected by the container detection unit 500 or 600, and information related thereto may be transmitted to the server. The server may determine the type, state, and the like of the container based on the information, and then determine whether to approve collection of the container, a deposit, and the like.

In a case in which movement of the transfer body 132 and the transfer plate 131 starts according to the container collection approval of the server, the extension part 135 may apply an external force to the lower plate 143, and the cover plate 142 may rotate from the first position to the second position around the coupling part 141. Accordingly, the opening 120 may be gradually opened (see FIG. 6B). In this instance, the container put on the holding unit 110 may be moved by the transfer plate 131, and may be transferred to the collection unit 200 through the opening 120 that is completely open. In this case, the cleaning liquid spray unit 300 may spray the cleaning liquid to different regions inside the collection unit 200 while moving toward the opening 120 together with the transfer body 132.

Thereafter, in a case in which the cover plate 142 is disposed at the second position that completely opens the opening 120, the transfer marker 136 and the second transfer detection unit may be aligned with each other, and at the same time, movement of the transfer body 132 and the transfer plate 131 may be at least temporarily terminated. Thereafter, in a case in which a predetermined period of time elapses, the transfer body 132 and the transfer plate 131 may be restored to the original positions, and the cover plate 142 may be rotated again to the first position by the elastic force of the elastic part 144 to close the opening 120.

When a series of container collecting processes is completed, the container collecting apparatus 1000 and/or the server may pay a deposit to the user or the user terminal in a predetermined manner.

The operation of the container collecting apparatus 1000 according to FIGS. 6A-6C is just exemplary, and various operating methods may be applied according to embodiments to which the present invention is applied.

The present invention has been particularly shown and described with reference to exemplary embodiments thereof. Although specific terms are used herein, they are just used for the purpose of describing the present invention and are not used to limit the scope of the present invention as set forth in the claims. Therefore, it will be understood by those of ordinary skill in the art that various changes and modifications may be made therein without departing from the technical idea and scope of the present invention. Therefore, the true technical protection scope of the present invention should be determined by the technical spirit of the appended claims.

The invention claimed is:

1. A container collecting apparatus, comprising:

a container input unit for accommodating a container inserted;

a door configured to open and close an inlet of the container input unit, and to allow or block insertion of the container into the container input unit;

at least one container detection unit configured to detect at least one of a state, a kind, a shape, a size, or any combination thereof, of the container; and a collection box provided below the container input unit and configured to collect the container transferred from the container input unit, wherein the container input unit comprises:

a holder on which the container is seated;

an opening disposed at one side of the holder to transfer the container to the collection box; and a transfer unit including a transfer plate for transferring the container placed on the holder to the opening by moving from a side of the holder toward the opening, wherein the at least one container detection unit includes at least one of a camera for capturing an image of the container or a code recognition reader configured to recognize an identification code of the container.

2. The container collecting apparatus according to claim 1, wherein the container input unit further comprises a cover disposed adjacent to the opening, the cover being movable between a first position in which at least a portion of the cover closes the opening and a second position in which at least a portion of the cover opens the opening.

3. The container collecting apparatus according to claim 2, wherein the cover comprises:

a coupling part including a hinge coupled to an inner surface of the container input unit; and a cover plate configured to rotate between the first position and the second position around the coupling part to close the opening.

4. The container collecting apparatus according to claim 3, wherein the cover further comprises a lower plate extending downward from an end of the cover plate to form a predetermined angle to the cover plate and disposed adjacent to a side surface of the holder at the first position.

5. The container collecting apparatus according to claim 3, wherein the transfer unit further comprises:

a transfer body of which one end is coupled to the transfer plate;

transfer rails for guiding movement of the transfer body; and a transfer driving part including a motor for transferring the transfer body and the transfer plate along the transfer rails.

6. The container collecting apparatus according to claim 5, wherein the transfer unit further comprises an extension part extending from the other end of the transfer body toward the opening, wherein in a case in which the extension part comes into contact with one side of the cover and applies an external force as the transfer body moves toward the opening, the cover opens the opening by rotating from the first position to the second position.

7. The container collecting apparatus according to claim 3, wherein the cover comprises an elastic part applying an elastic force to the cover plate from the second position toward the first position.

8. The container collecting apparatus according to claim 1, wherein at least one discharge hole for spraying cleaning liquid to the holder is disposed at the lower end of the transfer plate.

9. The container collecting apparatus according to claim 1, wherein the at least one container detection unit is configured to obtain the image of the container captured by the camera or the identification code recognized by the code recognition reader.

10. The container collecting apparatus according to claim 1, wherein the camera is disposed on at least one of an inner surface of the door or an upper side of an inner surface of the container input unit.

11. The container collecting apparatus according to claim 1, wherein the collection box comprises a height detector for detecting a collection amount of the container collected in the collection box.

12. The container collecting apparatus according to claim 1, further comprising:

a vibration generator provided at one side of the collection box and configured to apply vibration to the collection box.

13. A container collecting apparatus, comprising:

a container input unit for accommodating a container inserted; and a collection box provided below the container input unit and configured to collect the container transferred from the container input unit, wherein the container input unit comprises:

a holder on which the container is seated;

an opening disposed at one side of the holder to transfer the container to the collection box; and a transfer unit including a transfer plate for transferring the container placed on the holder to the opening by moving from a side of the holder toward the opening, wherein the transfer unit further includes a wiper disposed at a lower end thereof and configured to clean the holder while moving in contact with an upper surface of the holder when the transfer plate moves.

14. A container collecting apparatus, comprising:

a container input unit for accommodating a container inserted;

a collection box provided below the container input unit and configured to collect the container transferred from the container input unit; and wherein the container input unit comprises:

a holder on which the container is seated;

an opening disposed at one side of the holder to transfer the container to the collection box; and a transfer unit including a transfer plate for transferring the container placed on the holder to the opening by moving from a side of the holder toward the opening; and at least one cleaning liquid sprayer provided below the container input unit to spray a cleaning liquid to an inside of the collection box, wherein the at least one cleaning liquid sprayer is configured to spray the cleaning liquid to different regions of the collection box while being moved by the transfer unit.

* * * * *